(12) United States Patent
Giridhar

(10) Patent No.: US 9,121,526 B2
(45) Date of Patent: Sep. 1, 2015

(54) MICROFLUIDIC DEVICE WITH BENDABLE MEMBRANE HAVING VALVE PASSAGEWAYS TO PROVIDE ENHANCED FLUIDIC MOBILITY CONTROL AND RELATED METHODS

(75) Inventor: Archit Giridhar, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 507 days.

(21) Appl. No.: 13/611,704

(22) Filed: Sep. 12, 2012

(65) Prior Publication Data

US 2014/0069513 A1   Mar. 13, 2014

(51) Int. Cl.
*B01L 3/14* (2006.01)
*F16K 99/00* (2006.01)
*B01D 61/18* (2006.01)
*B01D 63/08* (2006.01)
*B01L 3/00* (2006.01)
*B01F 11/00* (2006.01)
*B01F 13/00* (2006.01)
*F04B 43/04* (2006.01)
*F04B 43/14* (2006.01)

(52) U.S. Cl.
CPC ............ *F16K 99/0042* (2013.01); *B01D 61/18* (2013.01); *B01D 63/088* (2013.01); *B01F 11/0051* (2013.01); *B01F 13/0059* (2013.01); *B01L 3/50273* (2013.01); *B01L 3/502753* (2013.01); *F04B 43/043* (2013.01); *F04B 43/14* (2013.01); *F16K 99/0015* (2013.01); *F16K 99/0025* (2013.01); *B01D 2313/18* (2013.01); *B01D 2325/021* (2013.01); *B01L 2300/0681* (2013.01); *B01L 2300/123* (2013.01); *B01L 2400/0475* (2013.01); *B01L 2400/0481* (2013.01); *Y10T 137/0491* (2015.04); *Y10T 137/87056* (2015.04)

(58) Field of Classification Search
CPC ....................................................... B01L 3/50
USPC .................................. 366/275; 239/536, 375
See application file for complete search history.

(56) References Cited

U.S. PATENT DOCUMENTS

| | | | | |
|---|---|---|---|---|
| 2,687,329 A * | 8/1954 | Hunter | ........................... | 239/282 |
| 2,814,529 A * | 11/1957 | Arnt | .............................. | 239/208 |
| 2,962,201 A * | 11/1960 | Brillis et al. | ................... | 229/400 |
| 5,078,504 A * | 1/1992 | Landa et al. | ................... | 366/118 |
| 5,183,607 A | 2/1993 | Beall et al. | | |
| 5,919,364 A | 7/1999 | Lebouitz et al. | | |
| 6,270,249 B1 * | 8/2001 | Besuner et al. | ............... | 366/332 |
| 2003/0042176 A1 | 3/2003 | Alderson et al. | | |
| 2004/0036047 A1* | 2/2004 | Richter | .................... | 251/129.06 |
| 2007/0045215 A1* | 3/2007 | Holley et al. | ................. | 215/11.4 |

* cited by examiner

*Primary Examiner* — David Sorkin
(74) *Attorney, Agent, or Firm* — Allen, Dyer, Doppelt, Milbrath & Gilchrist, P.A.

(57) ABSTRACT

A microfluidic device may include a substrate having a cavity therein, and a bendable membrane within the cavity and having a plurality of spaced apart valve passageways therein. The bendable membrane may be bendable between a first position with the valve passageways being opened, and a second position with the valve passageways being closed. The microfluidic device may further include an actuator configured to bend the bendable membrane between the first and second positions.

23 Claims, 5 Drawing Sheets

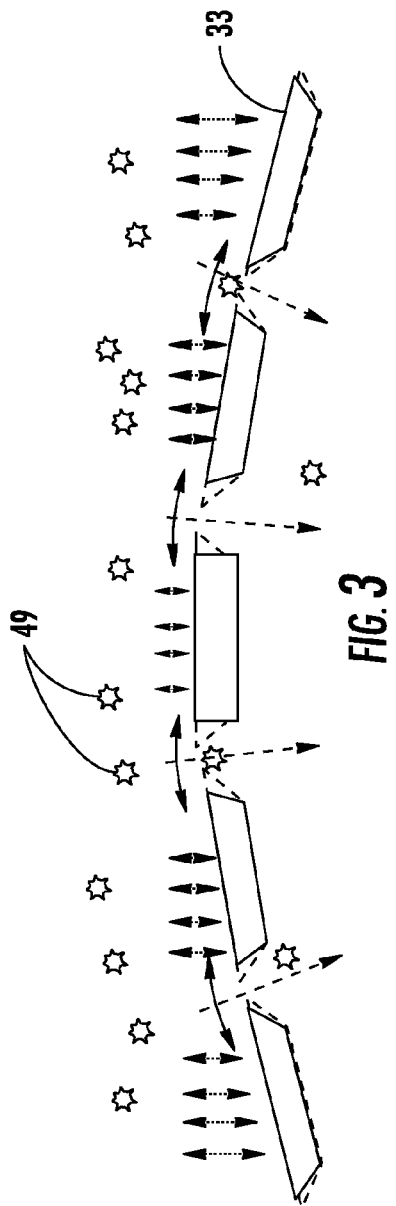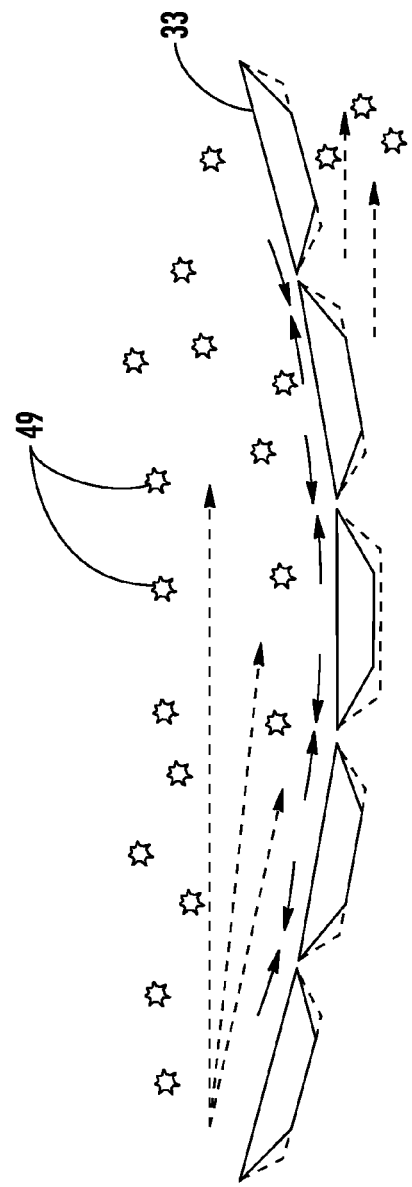

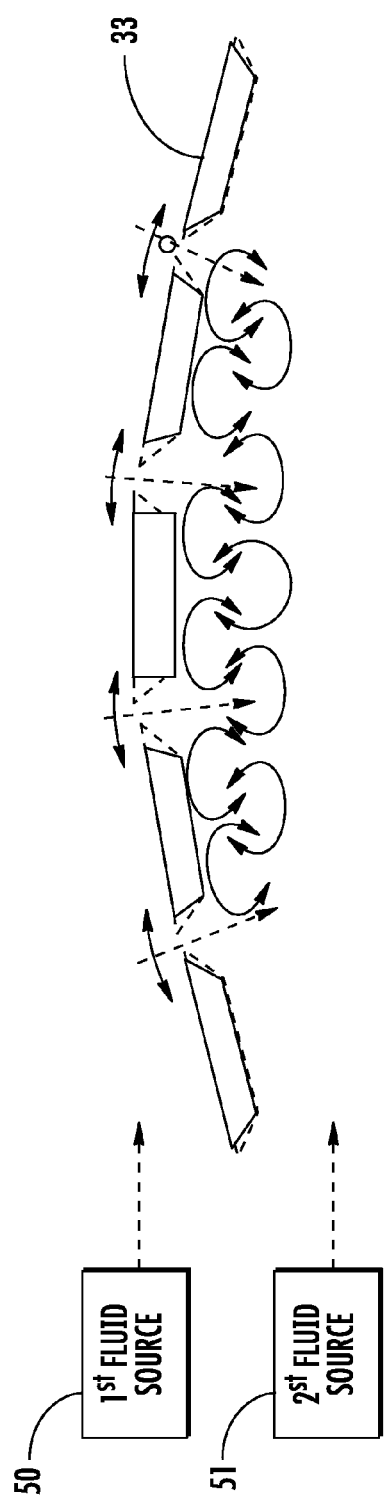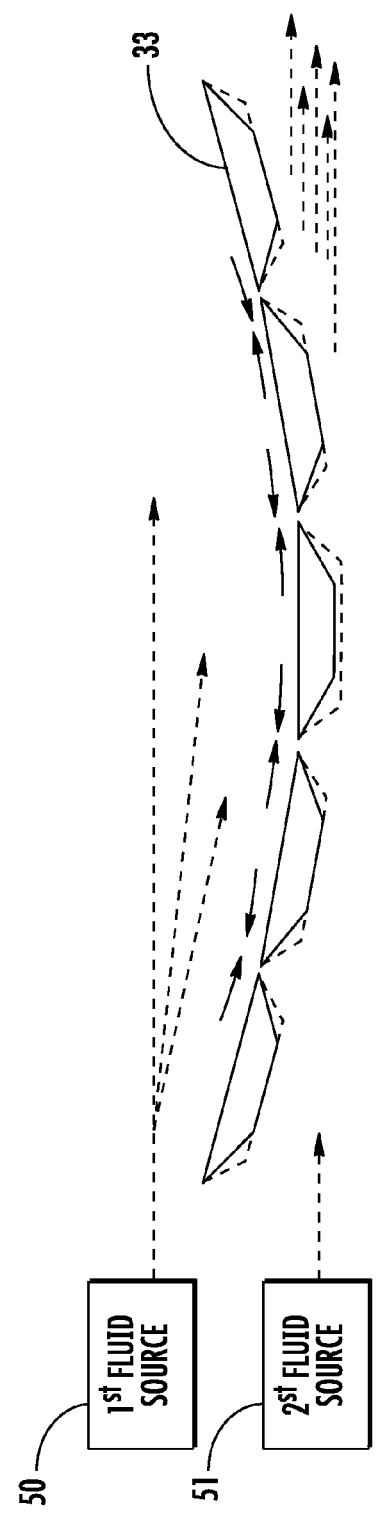

MICROFLUIDIC DEVICE WITH BENDABLE MEMBRANE HAVING VALVE PASSAGEWAYS TO PROVIDE ENHANCED FLUIDIC MOBILITY CONTROL AND RELATED METHODS

FIELD OF THE INVENTION

The present invention relates to the field of microfluidic devices and, more particularly, to devices for filtering and/or mixing of microfluids and related methods.

BACKGROUND OF THE INVENTION

Microfiltration is process in which contaminants are removed from a fluid (either solid, liquid or gas) by passage through a macroporous membrane. For example, typical microfiltration membrane pore sizes may range from about 0.1 to 10 micrometers. Membrane filters are used in a variety of applications, such as water filtration, biomedical, and biotechnology applications, for example.

One example microfiltration device is disclosed in U.S. Pat. No. 5,919,364 to Lebouitz et al. This patent discloses microfabricated filters constructed with permeable polysilicon membranes. The filters include a frame structure having a plurality of openings therethrough and a permeable polysilicon membrane disposed over the openings in the frame structure. The frame structure provides support for the permeable polysilicon membrane.

Another filtration approach is set forth in U.S. Pat. Pub. No. 2003/0042176 to Alderson et al. This publication discloses a method of separating at least part of one or more components from a mixture of components includes exposing the mixture to a porous barrier. The barrier is formed of a material structure having, or behaving in the manner associated with, a negative Poisson ratio.

Despite the existence of such configurations, further enhancements may be desirable for microfluidic filtration and/or fluid mixing applications.

SUMMARY OF THE INVENTION

In view of the foregoing, it is an object of the invention to provide a microfluidic device which provides enhanced filtration and/or mixing capabilities and related methods.

This and other objects, features, and advantages are provided by a microfluidic device which may include a substrate having a cavity therein, and a bendable membrane within the cavity and having a plurality of spaced apart valve passageways therein. The bendable membrane may be bendable between a first position with the valve passageways being opened, and a second position with the valve passageways being closed. The microfluidic device may further include an actuator configured to bend the bendable membrane between the first and second positions. Accordingly, the microfluidic device may thereby operate as a peristaltic pump to perform desired filtration and/or fluid mixing operations.

More particularly, each of the spaced apart valve passageways may have a tapered shape. By way of example, the bendable membrane may include a first layer and a second layer coupled to the first layer, and the second layer may have a same or different elasticity than the first layer. In one example embodiment, the bendable membrane may divide the cavity into first and second fluid chambers. A first fluid source may be coupled to the first chamber to introduce a first fluid therein, and a second fluid source may be coupled to the second chamber to introduce a second fluid therein. As such, the actuator may be configured to bend the bendable membrane between the first and second positions to mix the first and second fluids.

In another example embodiment, the spaced apart valve passageways may be configured to filter particles from a fluid when the actuator bends the bendable membrane between the first and second positions. The actuator may comprise a capacitive actuator, for example. Also by way of example, the actuator may comprise at least one pair of electrodes carried by the substrate on opposite sides of the membrane. In one example embodiment, the at least one pair of electrodes may comprise a plurality of pairs of electrodes arranged in a two-dimensional grid. Furthermore, the membrane may comprise at least one of a polymer and an elastomer, for example.

A related method of making a microfluidic device, such as the one described briefly above, is also provided. The method may include positioning a bendable membrane within a cavity of a substrate, where the bendable membrane has a plurality of spaced apart valve passageways therein. The bendable membrane may be bendable between a first position with the valve passageways being opened, and a second position with the valve passageways being closed. The method may further include coupling an actuator to bend the bendable membrane between the first and second positions.

BRIEF DESCRIPTION OF THE DRAWINGS

FIGS. 3 and 4 are cross-sectional views of the membrane of the microfluidic filter of FIG. 1 in first and second positions, respectively, to perform microfiltration.

FIGS. 5 and 6 schematic cross-sectional views of the membrane of the microfluidic filter of FIG. 1 in first and second positions, respectively, to perform microfluidic mixing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments.

Figure 11:
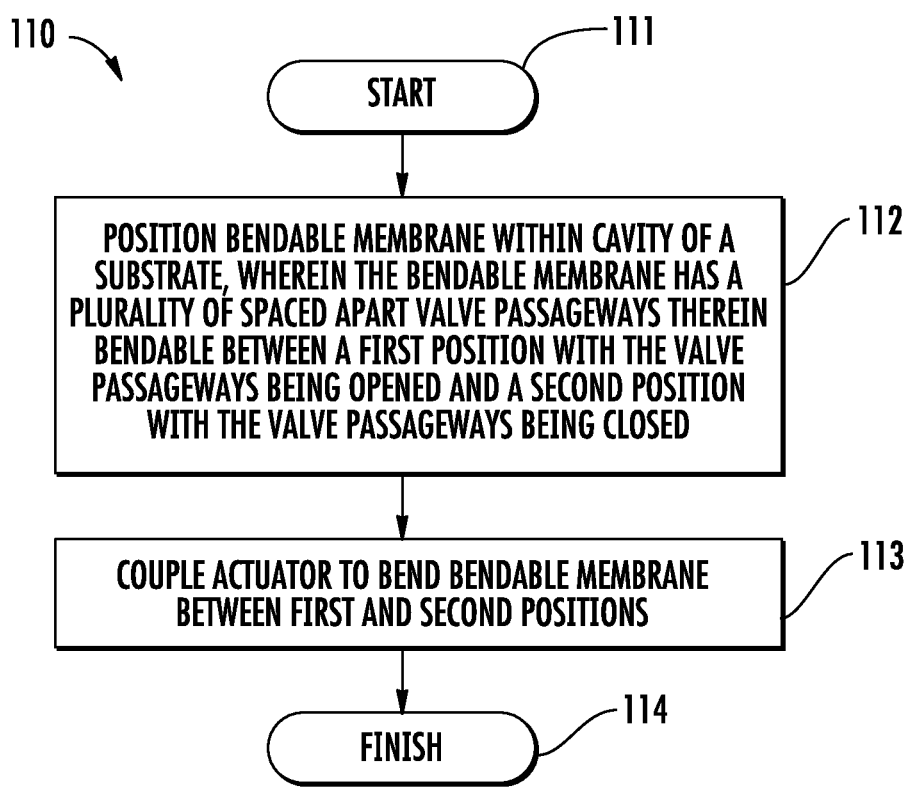
FIG. 11 is a flow diagram illustrating method aspects associated with making the microfluidic device of FIG. 1.

Referring initially to FIGS. 1 through 6, and the flow diagram 110 of FIG. 11, a microfluidic device 30 and associated method of making the device are first described. The microfluidic device 30 illustratively includes a substrate 31 having a cavity 32 therein. Beginning at Block 111, a bendable membrane 33 is positioned within the cavity 32, at Block 112. The bendable membrane 33 has a plurality of spaced apart valve passageways 34 therein. The bendable membrane 33 may be bendable between a first position with the valve passageways being opened (shown in FIGS. 3 and 5), and a second position with the valve passageways being closed (shown in FIGS. 4 and 6). The microfluidic device 30 further illustratively includes an actuator 35 (e.g., capacitive, piezoelectric, thermal, etc.) which is coupled to or carried by the substrate 31 (Block 113), which concludes the method illustrated in FIG. 11 (Block 114). More particularly, the actuator 35 is configured to bend the bendable membrane 33 between the first and second positions, as will be discussed further below.

The microfluidic device 30 may accordingly perform forced (e.g., pressure-assisted) microfiltration based on particulate size, and/or separation or mixing of two different fluids by positive displacement flow pumping (e.g., peristaltic pumping). By way of background, a fluid or matter in a liquid state is generally referred to as a solution, a homogeneous mixture of solute and solvent, or a semi-homogenous mixture of fluids. A solution including suspended or diffused particles is known as a colloidal solution. It may also include contaminants, impurities or particles with varying chemical or physical attributes dissolved and/or suspended in the same medium. Some particles dissolved or suspended in the solution have different sizes and may be filtered or purged out from the solution by a selective filtration technique. Similarly, two or more immiscible fluids at normal conditions may be blended mechanically or by other non-chemical methods, such as elevated temperature or pressure.

The microfluidic device 30 may advantageously remove or separate desired solute particles of different sizes from a solution, or decrease/increase a concentration of the solution without involving chemical reactions. By way of example, the solute particles (referred to as "particles" herein) may be invisible to the naked eye, and may be on the order of a few microns (e.g., less than five microns), although particles of larger size may also be filtered in some embodiments. Such particles that are targeted for segregation may vary in size in comparison to other solute particles (referred to as "solute" herein), which co-exist in the same medium. Where the solute is larger in dimension than the particle, the segregation or filtering may be made based on size.

The bendable membrane 33 may be used to selectively segregate particles 49 included in a solution or a fluid through a positive-displacement flow by an out-of-plane bending or buckling action. In the example illustrated in FIG. 1, the bendable membrane 33 is a single thin or thick film or layer structured by slacking or combining multiple layers of thin and/or thick films including a first (thick) layer 36 and a second (thin) layer 37 coupled to the first layer. Elements such as metal interconnects (i.e., with reference to the actuating system) may be sandwiched in between the first and second layers 36, 37 in such a way to seal or conceal them from exposure to the fluidic medium (e.g., to prevent corrosion, etc.). A variety of thickness ranges may be used for the first and second layers 36, 37, from sub-micron to tens or hundreds of microns, for example. By way of example, the first and second layers 36, 37 may include a polymer, elastomer, or other suitable membrane material which is bendable, flexible or elastic. Moreover, the valve passageways 34 are illustratively tapered to define first openings 38 in the first layer 36, which are larger than corresponding or respective second openings 39 in the second layer 37. In particular, the tapered arrangement provides a nozzle/diffuser-like configuration which advantageously acts as a valve during bending/buckling of the bendable membrane 33.

The valve passageways 34 are perforations or holes in the bendable membrane 33 which deform during bending. The deformation of the first and second layers 36, 37 of the bendable membrane 33, and opening and closing of the valve passageways 34, may be understood by considering the distribution of stress laterally across the first and second thin/thick layers 36, 37. More particularly, when a thin/thick film is subjected to bending or buckling, i.e., out-of plane deformation, the upper and lower layers of the film structure are subjected to lateral tensile and compressive stresses, as will be appreciated by those skilled in the art. Depending upon the desired differential purging (i.e., filtering) or blending operation to be performed, the bendable membrane may include a thin film layer, a thick film layer, a stack of thin film layers, or a complex stack with film layers of different thicknesses, for example. Thin films and thick films may be embedded with metal or electrical circuitry for specific actuation and/or other functionality, as will be discussed further below.

In the case of a filtering operating (see FIGS. 3-4), the out-of-plane buckling action of the first and second layers 36, 37 simultaneously pumps the fluid and selectively performs purging of particles 49 suspended in the fluid having a dimension smaller than the valve passageways 34 in the open position. This operation may also be performed to remove fluid, instead of (or in addition to) suspended particles 49. The purging or filtering is selective in that particles 49 are removed or filtered from the solution based upon their size. That is, the valve passageways 34 may be opened to different sizes to pass desired particles 49. In FIGS. 3-6, the dashed lines along the membrane layer 33 illustrate the change in shape of the membrane layer due to the tensile and compressive stresses.

When bending outward (or up) as shown in FIG. 3, the bendable membrane 33 is subjected to tensile stress, which opens the valve passageways 34, allowing movement of particles 49 through the value passages (i.e., from above the bendable membrane to below the bendable membrane in the illustrated example). On the other hand, when a compressive stress is applied to the bendable membrane 33, this closes the perforations as shown in FIG. 4, so that the bendable membrane 33 bends inward (or down) and the particles 49 are no longer able to pass through the valve passageways 34.

During the outward bending of the bendable membrane 33, the fluid or the solution including particles 49 that are to be filtered is subjected to a pressure, and this forces the particles 49 or excessive fluid through the valve passageways 34 so that they are purged or filtered from the fluid/solution. With regard to the inward bending of the bendable membrane 33 (FIG. 4), fluid is drawn in and the valve passageways 34 close, which ceases fluid flow through the valve passageways and forms a negative pressure (vacuum) around the region. The alternating inward and outward movement of the bendable membrane 33 generates a consecutive flow of fluid suction through a peristaltic pumping action, and selective filtration restricted to the size of the valve passageways 34 (when opened) is achieved.

Figure 1:
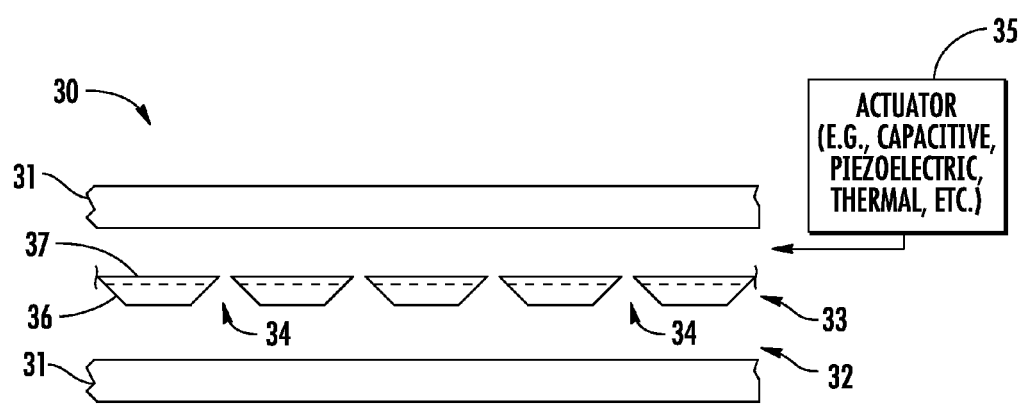
FIG. 1 is a schematic cross-sectional view of microfluidic device in accordance with the invention.
Figure 2:
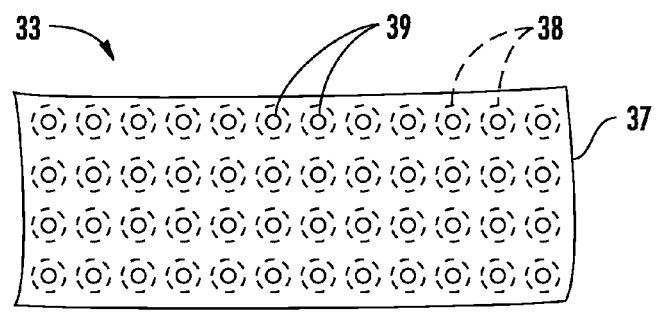
FIG. 2 is a top view of the bendable membrane of the microfluidic device of FIG. 1.

A similar technique may also be used to blend (e.g., mechanically force) particles or an immiscible fluid into the solution (see FIGS. 5-6). As seen in FIG. 1, the bendable membrane 33 may divide the cavity 32 into first and second fluid chambers above and below the bendable membrane 33. In the examples of FIGS. 5-6, a first fluid source 50 is coupled in fluid communication with the first chamber to introduce a first fluid therein, and a second fluid source 51 is coupled in fluid communication with the second chamber to introduce a second fluid therein. As such, the actuator 35 may be controlled to bend the bendable membrane 33 between the first and second positions so that the first and second fluids are mixed to a desired ratio.

More particularly, during the outward bending (FIG. 5) the bendable membrane 33 is pressed against the first fluid, which draws the first fluid through the valve passageways 34 and into the second fluid. When inward bending occurs (FIG. 6), the bendable membrane 33 draws in more of the first fluid into the first chamber as the flow through the valve passageways 34 ceases, causing a negative pressure (vacuum), as noted above. The buckling/bending action of the bendable membrane 33 accordingly creates a consecutive flow of fluid suction and blending, as shown.

The actuator 35 is configured to actuate the bendable membrane 33, that is bend the membrane layer to perform the positive-displacement pumping, purging/filtering, and/or blending of micro-fluids. Various types of actuators may be used, such as a dielectric/capacitive actuator, a piezoelectric actuator, a thermal actuator, etc., as will be appreciated by those skilled in the art.

Example capacitive-dielectric actuation approaches will now be described with reference to FIGS. 7-10. Generally speaking, the capacitive-dielectric pumping approach uses an electrostatic force that acts between two electrically conductive materials insulated from each other to execute the pumping, purging/filtering, and/or blending action. More particularly, a fluidic medium is typically dielectric by nature. Thus, when a voltage is applied between two electrically conductive structures placed on either sides of the fluid, one of which is fixed and the other is moveable, the moveable structure tends to move or deflect towards the fixed structure due to electrostatic attraction, which may be considered as a capacitive actuation.

Figure 7:
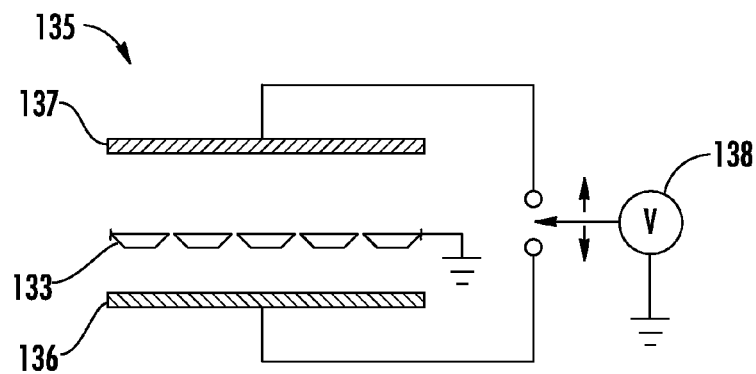
FIG. 7 is a schematic cross-sectional diagram illustrating a capacitive actuator that may be used with the microfluidic device of FIG. 1.

An exemplary capacitive actuator 135 is shown in FIG. 7. Two electrically conductive plates or terminals 136, 137 are arranged parallel to one another other and on opposite sides of a bendable membrane 133. The bendable membrane moves toward the lower conductive plate 136 when a voltage is applied from a voltage source 138 to the lower conductive plate (i.e., a pull-in voltage). Similarly, to cause the bendable membrane 133 to bend outwardly (i.e., up), a voltage may be applied to the upper conductive plate 137 (i.e., a pull-out voltage). The displacement may be linear with respect to the pull-in and pull-out voltages, for example. By way of example, the membrane 133 may be returned to an initial position by using a repulsive force, e.g., by reversing the potential, applying a potential to the opposing conductive plate, or as a result of the mechanical stiffness of the bendable membrane material, depending upon the given configuration.

Figure 8:
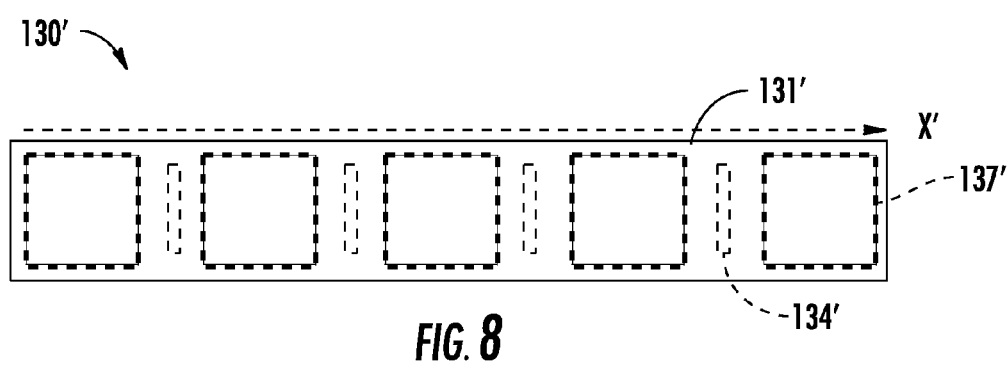
FIGS. 8 and 9 are top and cross-sectional views, respectively, of an alternative embodiment of the microfluidic device of FIG. 1 including a linear capacitive actuator configuration.
Figure 9:
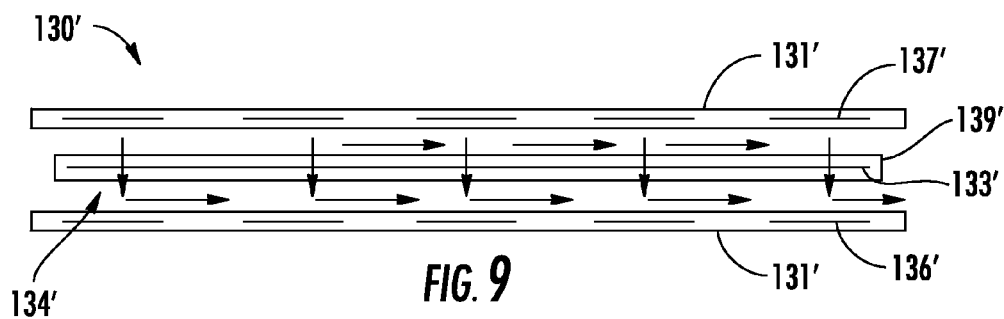

A microfluidic device 130', which illustratively includes a linear capacitive actuator array, is shown in FIGS. 8-9. More particularly, a plurality of pairs of conductive plates 136', 137' are linearly spaced apart along a substrate 131' along a direction of fluid flow, with regions of valve passageways 134' interspersed between adjacent pairs of conductive plates. Furthermore, a conductive layer 139' (e.g., thin metal or conductive ink) is positioned within the bendable membrane 133' so that it will be moved when voltage is applied across the pairs of conductive plates 136', 137'. In some embodiments, different voltages may be applied to different pairs of conductive plates 136', 137' to provide more or less deformation of the bendable membrane 133' in different locations, or the same voltage may be applied to all of the conductive plates.

In the illustrated linear actuation configuration, the fluid flow is unidirectional along a single axis X', which is indicated with a dashed arrow in FIG. 8. The bendable membrane 133' is excited to achieve an out-of-plane deformation to thereby perform peristaltic pumping, along with the accompanying purging or blending operation. By way of example, such a linear actuation arrangement may be for a single purging or blending application, although this configuration may also be used for multiple differential purging or blending operations.

Figure 10:
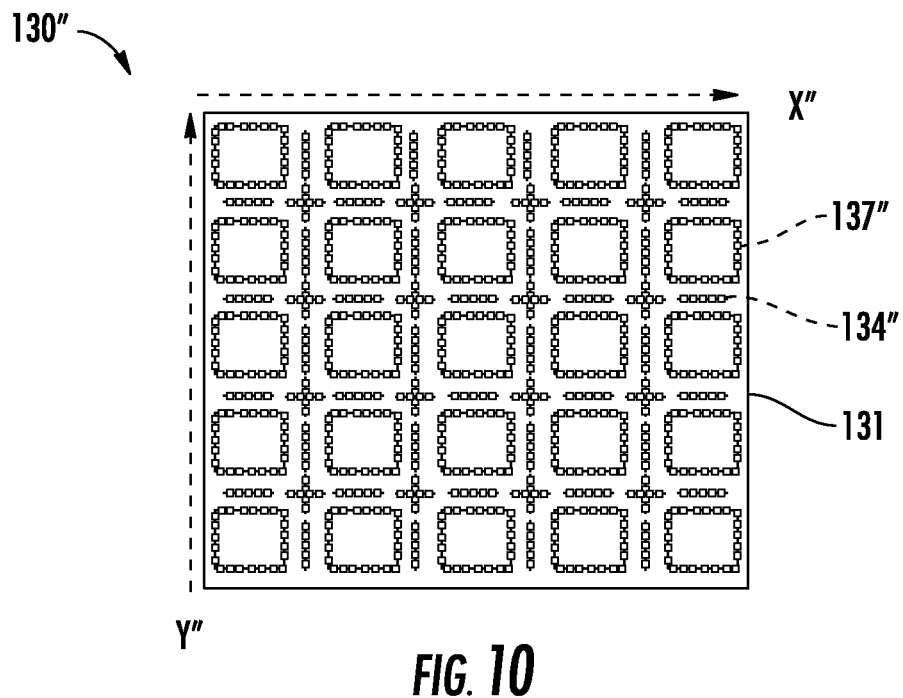
FIG. 10 is a top view of an alternative embodiment of the microfluidic device of FIG. 1 including a bi-linear capacitive actuator configuration.

Another example microfluidic device 130" is shown in FIG. 10, in which a bi-linear (or two-dimensional) capacitive actuation configuration is provided. More particularly, a plurality of pairs of conductive plates are arranged in a two-dimensional grid or array along the top and bottom surfaces of the substrate 131" (note that only the upper conductive plates 137" are shown in the top view of FIG. 10). In this bi-linear configuration, fluid flow may be unidirectional along either (or both) of X" or Y" axes. Such a matrix-like arrangement may be used for more complex purging, blending or purge/blend operations, for example.

The valve passageways 134" are similarly arranged or interspersed between the adjacent pairs of capacitive plates, as shown. Microfiltration may be performed by using a ratio of one or more inlets to two or more outlets connected by fluidic channels with the pump and purge system for segregation of particles or fluids in the system, for example. Also by way of example, a configuration for blending two or more fluids into a single homogenous or semi-homogenous mixture may include two or more inlets (as similarly described above with reference to FIGS. 5 and 6), depending upon the number of fluids to be integrated, and one or more outlets connected via fluid channels within the pump and blend system.

It should also be noted that in some embodiments more than one of the above-described microfluidic devices may be stacked or coupled together to provide operation with multiple fluids, and/or different levels or degrees of filtration, as will be appreciated by those skilled in the art. By way of example, multiple microfluidic devices may be stacked in a vertical fashion (i.e., a three dimensional stack), and which may also be linear or bi-linear as described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A microfluidic device comprising:
   a substrate having a cavity therein;
   a bendable membrane within the cavity and having a plurality of spaced apart valve passageways therein, the valve passageways tapering from a first opening on a first side of the bendable membrane to a second opening on a second side of the membrane that is larger than the first opening, and said bendable membrane being bendable between a first position with the valve passageways being opened and a second position with the valve passageways being closed; and
   an actuator configured to bend said bendable membrane between the first and second positions.

2. The microfluidic device of claim 1 wherein said bendable membrane comprises a first layer and a second layer coupled to said first layer; and wherein said second layer has a different elasticity than said first layer.

3. The microfluidic device of claim 1 wherein said bendable membrane comprises a first layer and a second layer coupled to said first layer; and wherein said second layer has a same elasticity as said first layer.

4. The microfluidic device of claim 1 wherein said bendable membrane divides the cavity into first and second fluid chambers.

5. The microfluidic device of claim 4 further comprising a first fluid source coupled to the first chamber to introduce a first fluid therein and a second fluid source coupled to the second chamber to introduce a second fluid therein; and wherein said actuator is configured to bend said bendable membrane between the first and second positions to mix the first and second fluids.

6. The microfluidic device of claim 1 wherein the spaced apart valve passageways are configured to filter particles from a fluid when said actuator bends said bendable membrane between the first and second positions.

7. The microfluidic device of claim 1 wherein said actuator comprises a capacitive actuator.

8. The microfluidic device of claim 1 wherein said actuator comprises at least one pair of electrodes carried by said substrate on opposite sides of said membrane.

9. The microfluidic device of claim 8 wherein said at least one pair of electrodes comprises a plurality of pairs of electrodes arranged in a two-dimensional grid.

10. The microfluidic device of claim 1 wherein said membrane comprises at least one of a polymer and an elastomer.

11. A microfluidic device comprising:
a substrate having a cavity therein;
a bendable membrane within the cavity and dividing the cavity into first and second fluid chambers;
said bendable membrane having a plurality of spaced apart valve passageways therein, the valve passageways tapering from a first opening on a first side of the bendable membrane to a second opening on a second side of the membrane that is larger than the first opening, and said bendable membrane being bendable between a first position with the valve passageways being opened and a second position with the valve passageways being closed;
a first fluid source coupled to the first chamber to introduce a first fluid therein;
a second fluid source coupled to the second chamber to introduce a second fluid therein; and
an actuator configured to bend said bendable membrane between the first and second positions to mix the first and second fluids.

12. The microfluidic device of claim 11 wherein said bendable membrane comprises a first layer and a second layer coupled to said first layer; and wherein said second layer has different elasticity than said first layer.

13. The microfluidic device of claim 11 wherein said actuator comprises a capacitive actuator.

14. The microfluidic device of claim 11 wherein said actuator comprises at least one pair of electrodes carried by said substrate on opposite sides of said membrane.

15. A microfluidic device comprising:
a substrate having a cavity therein;
a bendable membrane within the cavity and having a plurality of spaced apart valve passageways therein, the valve passageways tapering from a first opening on a first side of the bendable membrane to a second opening on a second side of the membrane that is larger than the first opening, and said bendable membrane being bendable between a first position with the valve passageways being opened and a second position with the valve passageways being closed to filter particles from a fluid; and
an actuator configured to bend said bendable membrane between the first and second positions.

16. The microfluidic device of claim 15 wherein said bendable membrane comprises a first layer and a second layer coupled to said first layer; and wherein said second layer has different elasticity than said first layer.

17. The microfluidic device of claim 15 wherein said actuator comprises a capacitive actuator.

18. The microfluidic device of claim 15 wherein said actuator comprises at least one pair of electrodes carried by said substrate on opposite sides of said membrane.

19. A method of making a microfluidic device comprising:
positioning a bendable membrane within a cavity of a substrate, the bendable membrane having a plurality of spaced apart valve passageways therein, the valve passageways tapering from a first opening on a first side of the bendable membrane to a second opening on a second side of the membrane that is larger than the first opening, and the bendable membrane being bendable between a first position with the valve passageways being opened and a second position with the valve passageways being closed; and
coupling an actuator to bend the bendable membrane between the first and second positions.

20. The method of claim 19 wherein the bendable membrane comprises a first layer and a second layer coupled to the first layer; and wherein the second layer has a different elasticity than the first layer.

21. The method of claim 19 wherein positioning comprises positioning the bendable membrane to divide the cavity into first and second fluid chambers.

22. The method of claim 21 wherein the actuator is configured to bend the bendable membrane between the first and second positions to mix a first fluid to be positioned in the first chamber with a second fluid to be positioned in the second.

23. The method of claim 19 wherein the spaced apart valve passageways are configured to filter particles from a fluid when the actuator bends the bendable membrane between the first and second positions.

* * * * *